United States Patent
Summer

(10) Patent No.: US 9,735,675 B2
(45) Date of Patent: Aug. 15, 2017

(54) RADIATION HARDENED ACTIVE OR CIRCUIT

(71) Applicant: Steven E. Summer, Plandome, NY (US)

(72) Inventor: Steven E. Summer, Plandome, NY (US)

(*) Notice: Subject to any disclaimer, the term of this patent is extended or adjusted under 35 U.S.C. 154(b) by 477 days.

(21) Appl. No.: 14/330,867

(22) Filed: Jul. 14, 2014

(65) Prior Publication Data

US 2016/0013640 A1 Jan. 14, 2016

(51) Int. Cl.
*H02J 1/00* (2006.01)
*H02M 3/155* (2006.01)
*H02M 3/156* (2006.01)

(52) U.S. Cl.
CPC .................. *H02M 3/1563* (2013.01)

(58) Field of Classification Search
None
See application file for complete search history.

(56) References Cited

U.S. PATENT DOCUMENTS

| | | | | |
|---|---|---|---|---|
| 8,653,695 B2 * | 2/2014 | Chang | ................... | H02J 1/10 307/80 |
| 8,772,966 B1 * | 7/2014 | Agrawal | ................... | H02J 1/08 307/80 |
| 2014/0362037 A1 * | 12/2014 | Kao | ................... | G06F 3/042 345/174 |

* cited by examiner

*Primary Examiner* — Jared Fureman
*Assistant Examiner* — Aqeel Bukhari
(74) *Attorney, Agent, or Firm* — Feldman Law Group, P.C.; Steven M. Crosby

(57) ABSTRACT

A radiation hardened active OR circuit for providing a controlled electrical response in radiation-intensive applications. The circuit can include a first voltage source; a second voltage source; a comparator for sampling the first voltage source and the second voltage source; a first switch; and a second switch. The comparator can select a higher magnitude of the first voltage source and the second voltage source and connects the higher magnitude of the first voltage source and the second voltage source to a common output by steering a drive signal to one of the first switch or the second switch.

11 Claims, 7 Drawing Sheets

Fig. 1 Simplified Block Diagram
Diode OR

Fig. 2 Simplified Block Diagram
Radiation Tolerant
Active OR

Fig. 3 Simplified Block Diagram
Radiation Tolerant
Active OR with Over Voltage Shutoff
with back to back FETs Fig. 4 Simplified Block Diagram
Radiation Tolerant
Active OR
Bias DC-DC Converter

RADIATION HARDENED ACTIVE OR CIRCUIT

BACKGROUND

The present invention relates to a radiation hardened active "OR" circuit.

Certain electronic applications use two or more independent voltage sources to improve reliability. In the event of one of the power sources dropping out or becoming too low to operate the load circuitry, the load is powered by a second source. Many such applications are designed for use in satellites and spacecraft. In these applications, function must operate in the presence of high radiation levels.

As shown in FIG. 1, a simple diode OR circuit 1 is shown. A simple diode OR circuit 1 can be implemented by connecting two power sources 2, 3 to the load 6 through two rectifiers 4, 5. The higher magnitude of the two voltage sources 2, 3 supplies the load 6 while current is not allowed to be fed to the lower magnitude voltage source. This type of connection is termed a "redundant" arrangement. The connection of two voltage sources 2, 3 to two rectifiers 4, 5 with a common output 6 is termed an "OR" or "diode OR" circuit.

There are two significant drawbacks to the diode OR circuit 1. One drawback is the power loss associated with the voltage drop across the rectifier that is conducting current. A second drawback is that a voltage sources doesn't always fail by reducing or dropping out, but may instead fail by increasing in magnitude. In the latter instance, instead of the application being more reliable due to the use of the diode OR, the diode OR may allow a potentially damaging overvoltage to be applied to the load. Furthermore, when a simple diode OR circuit is used for low voltage, high current applications, the resultant power and voltage drop may be intolerable.

SUMMARY

Active "OR" devices are circuits designed to efficiently combine two redundant voltage sources that feed a single load. The object of the disclosed technology is to implement radiation hardened active "OR" devices, using non-radiation hardened transistors. This invention is a method of implementing an economical active OR circuit that can operate in a high ionizing radiation dose environment such as found in spacecraft and particle accelerator applications.

In one implementation, a radiation hardened active OR circuit for providing a controlled electrical response in radiation-intensive applications comprises: a first voltage source; a second voltage source; a comparator for sampling the first voltage source and the second voltage source; a first switch; and a second switch, wherein the comparator selects a higher magnitude of the first voltage source and the second voltage source and connects the higher magnitude of the first voltage source and the second voltage source to a common output by steering a drive signal to one of the first switch or the second switch.

In some implementations, the first switch can be a P-channel MOSFET and the second switch can be a P-channel MOSFET, wherein the first switch and the second switch require higher bias voltages, when properly driven, in radiation environments.

In some implementations, the circuit can further comprise: a bias voltage DC-DC converter; and a diode circuit for feeding voltage to the bias voltage DC-DC converter, wherein the bias voltage DC-DC converter converts a low voltage source from the diode circuit into a higher bias voltage thereby properly driving the one of the first switch or the second switch. In some implementations, when a bias voltage is present and when the comparator steers the higher bias voltage to the one of the first switch or the second switch, a drain to source channel of the one of the first switch or the second switch conducts and a voltage drop is reduced to a value determined by a resistance of the one of the first switch or the second switch.

In another implementation, a radiation hardened active OR circuit for providing controlled electrical response in radiation-intensive applications comprises: a first voltage source; a second voltage source; a voltage sense/shutdown block; a first set of FETs, the first set of FETs being connected in series; and a second set of FETs, the second set of FETs being connected in series, wherein the voltage sense/shutdown block disconnects the first voltage source or the second voltage source in the event that one of the first voltage source or the second voltage source exceeds a pre-set, programmable limit.

In some implementations, the use of the first set of FETs being connected in series and the second set of FETs being connected in series in each voltage source leg can allow one or both of the voltage sources to be completely disconnected from a common output in the event of the one of the first voltage source or the second voltage source exceeding the pre-set, programmable limit.

In some implementations, the circuit can further comprise: a comparator for sampling the first voltage source and the second voltage. In some implementations, when a voltage level of the first voltage source exceeds pre-set, programmable limit, a first signal from the voltage sense/shutdown block is fed to the comparator which causes a gate drive voltage to be removed from the first set of FETs, and, when a voltage level of the second voltage source exceeds pre-set, programmable limit, a second signal from the voltage sense/shutdown block is fed to the comparator which causes a gate drive voltage to be removed from the second set of FETs.

In some implementations, the comparator may select a higher magnitude of the first voltage source or the second voltage source and connects the higher magnitude of the first voltage source or the second voltage source to a common output by steering a drive signal to the first set of FETs or the second set of FETs.

In some implementations, the first set of FETs can be P-channel MOSFETs and the second set of FETs can be P-channel MOSFETs, the first set of FETs and the second set of FETs requiring a higher bias voltage, when properly driven, in radiation environments.

In some implementations, the circuit can further comprise: a bias voltage DC-DC converter; and a diode circuit for feeding voltage to the bias voltage DC-DC converter, wherein the bias voltage DC-DC converter converts a low voltage source from the diode circuit into a higher bias voltage thereby properly driving the first set of FETs or the second set of FETs.

An "active OR" circuit can substitute a controllable active element, such as, a transistor, e.g., a MOSFET in place of the diode. Although this transistor must be driven by a control signal, the use of a transistor can result in a lower voltage drop than is obtained with a simple diode.

DETAILED DESCRIPTION

Figure 2:
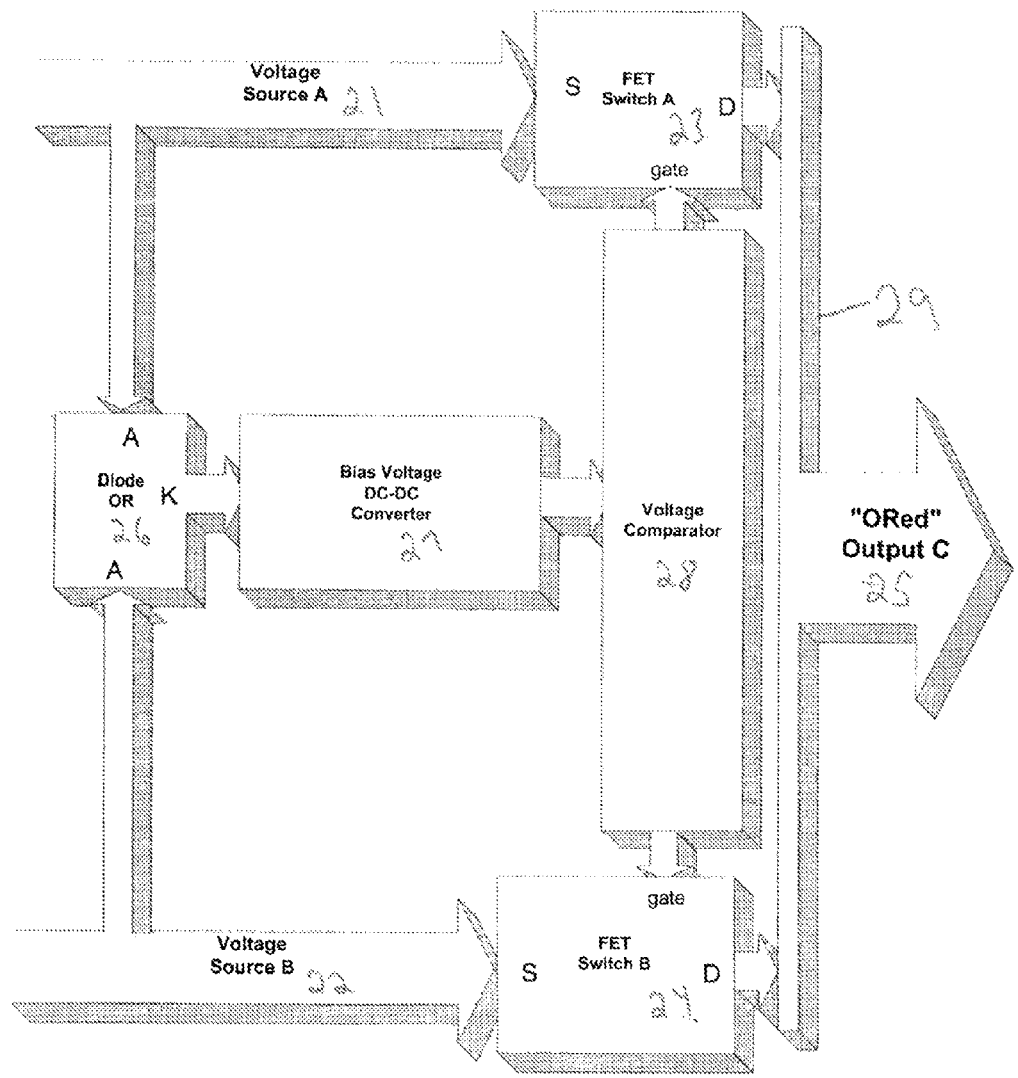
FIG. 2 is a block diagram of a radiation tolerant active OR circuit of the disclosed technology.

A simplified block diagram of a radiation tolerant active OR circuit is shown in FIG. 2. Referring to FIG. 2, there are two independent voltage sources—voltage source A 21 and voltage source B 22. These voltage sources 21, 22 are connected to form output 25. The desired function of the active OR circuit 20 is to select the higher magnitude of either voltage source 21, 22 and to efficiently connect the higher magnitude source to output 25.

In some implementations, a semiconductor device for power control in an active OR circuit can be an insulated gate FET (Field Effect Transistor), due to its high power gain. FETs used for power switching use are usually enhancement mode types. This means that they are normally non-conducting. When a gate voltage above a threshold is applied, the FET becomes conducting. FETs are available in two gate polarities; N channel and P channel. Power switching circuits designed for general purpose use are usually constructed with N channel FETs because, for any given die size transistor, the N channel FET has a lower on resistance than a correspondingly sized P channel FET would have.

The radiation hardened active OR circuit 20 of the disclosed technology uses P channel MOSFETs 23, 24 since these devices are inherently functional, when properly driven, in radiation environments.

Figure 1:
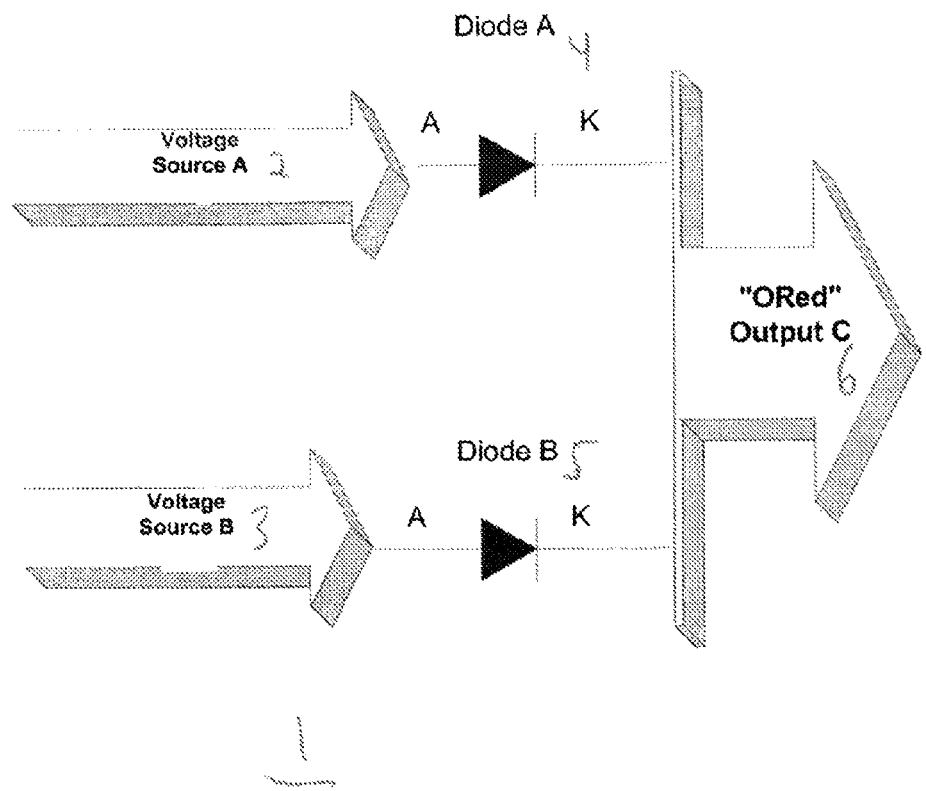
FIG. 1 is a block diagram of a simple diode OR circuit.

For background, an ordinary diode OR, as shown in FIG. 1, creates a proportionally greater voltage drop when combining low voltage sources. Such low voltage sources may be in the range of 0.9 VDC to 5 VDC. Therefore, an active OR is most beneficial when it is used combines low voltage sources. However, P channel MOSFETs require higher bias voltage for proper drive and radiation tolerance. Therefore the function of the Bias Voltage DC-DC converter block 27 is to convert a low voltage source (typically as low as 2.5 VDC) to at least 15 VDC to properly drive the FETs 23, 24. In order to supply the Bias Voltage DC-DC converter block 27, a conventional diode or circuit 26 is used. In some implementations, the diode circuit 27 can consist of two diodes with a common cathode connection (not shown) that feeds voltage to the bias voltage DC-DC converter 27. This provides bias power if either of the two voltage source inputs 21, 22 have a sufficiently high voltage.

The radiation hardened active OR circuit of the disclosed technology also includes a voltage comparator 28. The voltage comparator 28 is capable of sampling each of the two input voltage sources 21, 22 and then steer a drive signal to energize the higher of the two sources 21, 22. The input to the voltage comparator 28 must sense the higher of the two input sources 21, 22 without allowing current to flow from one source to another. The output of the voltage comparator 28 can be a negative drive voltage, referred to the most positive input, of at least 15 VDC.

The radiation hardened active OR circuit 20 of the disclosed technology can also include power switches 23, 24. That is, the active OR of FIG. 2 has two independent power switches, switch A 23 and switch B 24. The source terminal of each of the P FET switches 23, 24 is connected to the respective input power bus 29, and the drain of both P FETs 23, 24 is tied in common to the output 25. In this way, without application of bias voltage, the intrinsic body-drain diode of each FET acts as a simple diode OR. When bias voltage is present, and when the comparator steers the bias voltage to the appropriate FET, the FET drain to source channel conducts and the voltage drop is reduced to a value determined by the on resistance of the FET.

In short, the active OR shown in FIG. 2 is a relatively simple circuit that selects the higher of two input voltages and efficiently connects the higher of the two voltages to a common output. This increases system reliability since the output is maintained even if one of the two voltage sources decreases below usability, or drops out altogether.

However, in a small fraction of instances, one of the voltage sources may fail and produce a damaging over voltage. In this case, the Active OR still operates, and the A higher, damaging voltage, will be applied to the load.

Figure 3:
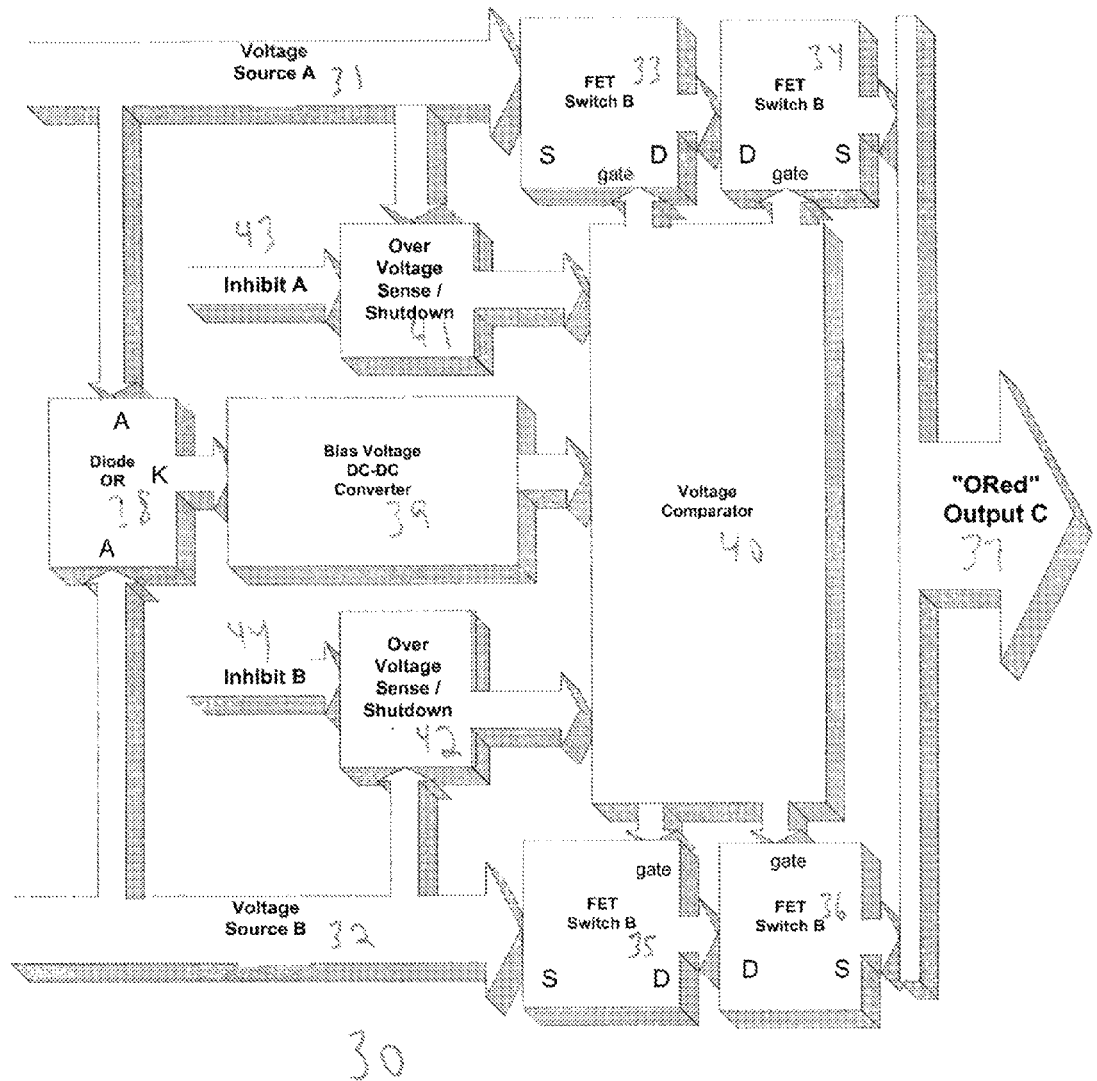
FIG. 3 is a block diagram of a radiation hardened active OR circuit combined with an over voltage shutoff of the disclosed technology.

In one implementation, to overcome the limitations of the circuit of FIG. 2, a radiation hardened active OR combined with over-voltage shutoff of FIG. 3 can be used. One advantage of FIG. 3's circuit 30 as compared to FIG. 2's circuit 20 is the means to disconnect either voltage source A or voltage source B in the event that one (or both) of the voltage sources exceeds a pre-set, programmable limit, possibly due to a failure. This protects a load connected to output C 37. An additional feature is the ability to disconnect either voltage source A, voltage source B or both voltage sources, by operating an inhibit pin 43, 44.

The circuit of FIG. 3 is a derivative of the circuit of FIG. 2. However, the single FET in each input power leg is replaced with a series connection of two back-to-back FETS 33/34, 35/36 connected to a common output 37. The use of two back-to-back FETs 33/34, 35/36 in each voltage source leg, in lieu of single FETs, allows one or both of the voltage sources 31, 32 to be completely disconnected from the common connection in the event of an unacceptably high over voltage. It should be noted that the use of a single PET in each voltage source leg (instead of two back-to-back FETs), with the voltage source connected to the drain and a common source connection, would be unsatisfactory. This would allow conduction of the body drain diode to conduct from the output in the event that one of the voltage sources was shorted.

Referring to FIG. 3. Voltage source A 31 is compared to a fixed reference voltage by a comparator 40. The voltage reference and comparator comprise over voltage sense/shutdown block 41. When the voltage level of source A 31 exceeds a preset value, a signal from the over voltage sense/shutdown block 41 is fed to voltage comparator 40 and causes the gate drive voltage to be removed from FET switches 33/34.

Similarly, voltage source B 32 is sensed by over voltage/sense block 42 and causes a removal of gate drive to FETs 35/36 in the event that voltage source B 32 exceeds a preset value. Additionally, the over voltage/sense blocks 41, 42 have the ability to disconnect one or both voltage sources 31, 32 using inhibit pins 43, 44. Inhibit commands using the inhibit pins 43, 44 can be very useful in high radiation environments. This function is readily implemented by using the shutdown means in block 41, 42.

Figure 4:
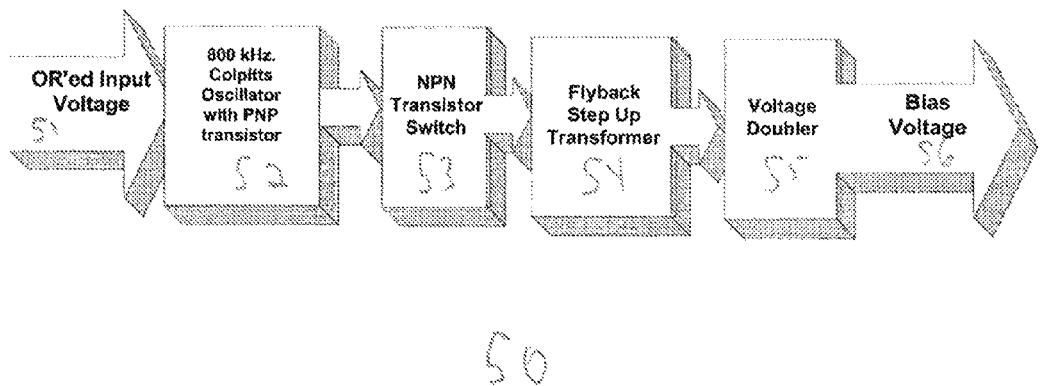
FIG. 4 is a block diagram of bias voltage DC-DC converter of the disclosed technology.

The radiation hardened active OR circuit 30 of FIG. 3 also includes a bias voltage DC-DC converter 39. Although the design of the bias DC-DC converter 39 may use any number of suitable topologies, in some implementations, the converter 50 of FIG. 4 can be used. The diode OR input voltage 51 from voltage source A and voltage source B can be fed to a Colpitts LC oscillator 52 operating at 800 kHz. The oscillator 52 can use a PNP bipolar transistor suitable for low voltage operation. A PNP transistor is desirable because the current gain of a PNP transistor usually degrades less than the current gain of an NPN transistor after accumulation of ionizing radiation.

The PNP Colpitts oscillator stage 52 is followed by an NPN switch stage 53. When working with a low supply voltage, it is often advantageous to use complementary polarity devices. The NPN switch stage 53, in turn, drives a flyback step up transformer 54. The output of the flyback transformer 54 then drives a diode/capacitor voltage doubler 55, ultimately resulting in a 15 to 20 VDC bias voltage 56 from a 2.5 VDC source.

Figure 5:
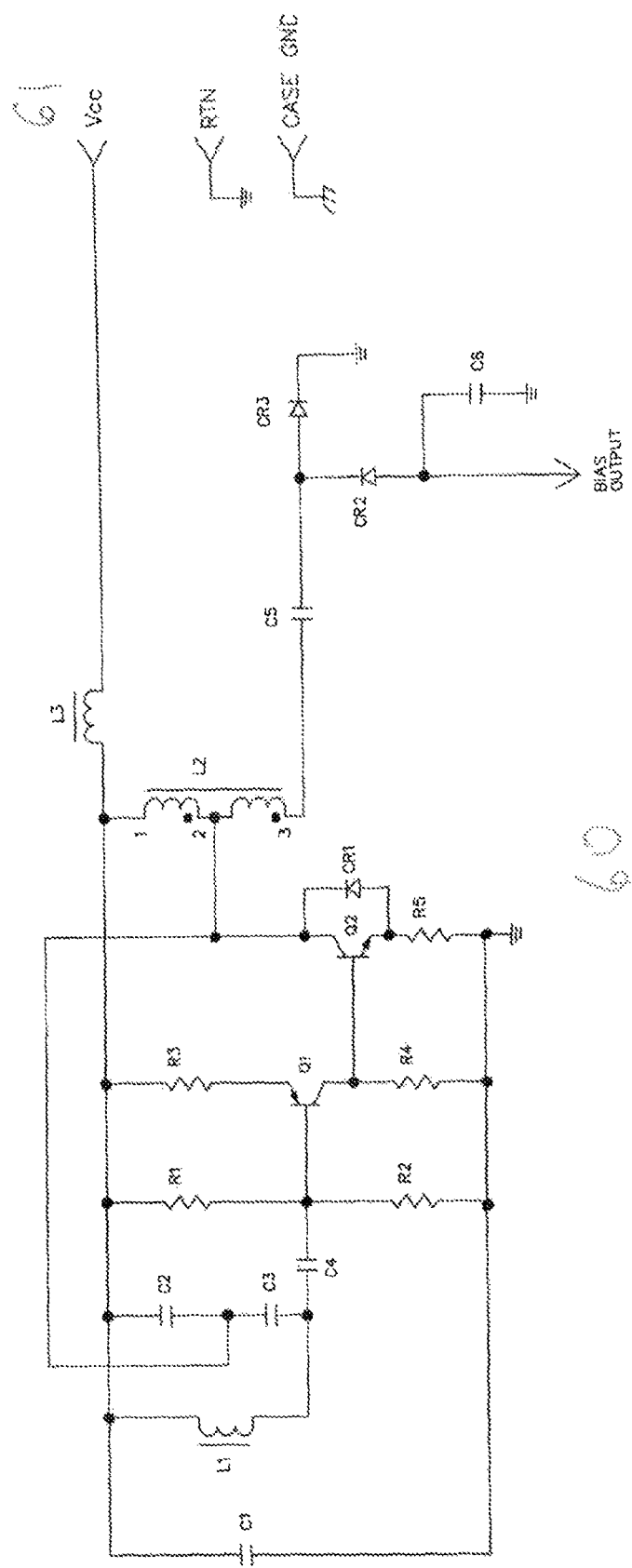
FIG. 5 is a circuit diagram of bias voltage DC-DC converter of the disclosed technology.

Although the design of the bias DC~DC converter 50 may use any number of suitable topologies, in some implementations, the converter 60 of FIG. 5 can be used. In FIG. 5, a low voltage source (Vcc) 61 is fed through inductor L3 for filtering. Capacitor C1 is a filter bypass capacitor. A Colpitts oscillator tank is formed by L1, C2 and C3. The output of the tank circuit is fed through DC blocking capacitor C4, then to the base of PNP transistor Q1. Resistors R1 and R2 bias the base of Q1 in the active region. Resistor R3 limits the collector current of Q1. Resistor R4 is the collector load of Q1, and this drives the base of Q2. Q1 and Q2 each provide 180 degree phase shifts, and the combination of Q1 and Q2 form a non inverting amplifier. The collector of Q2 drives the C2~C3 tap of the Colpitts oscillator tank, as well as the tap of L2, a step up auto transformer. Resistor RS limits the current in Q2 and CR1 prevents the collector of Q2 from going negative with respect to the emitter. Pin 1 of tapped inductor L2 is connected to the filtered Vcc supply voltage 61. Pin 3 produces a stepped up sinusoid voltage at the Colpitts oscillator frequency. The oscillation frequency of the Colpitts oscillator is preferably determined by the L1, C2, C3 components to be in the 500 kHz to 1 mHz range to allow small size inductive components. The stepped up sinusoid produce by L2 pin 3 as DC restored by CS and CR3, then peak detected by CR2 and C6. This circuit is also described as a diode voltage doubler.

Figure 6:
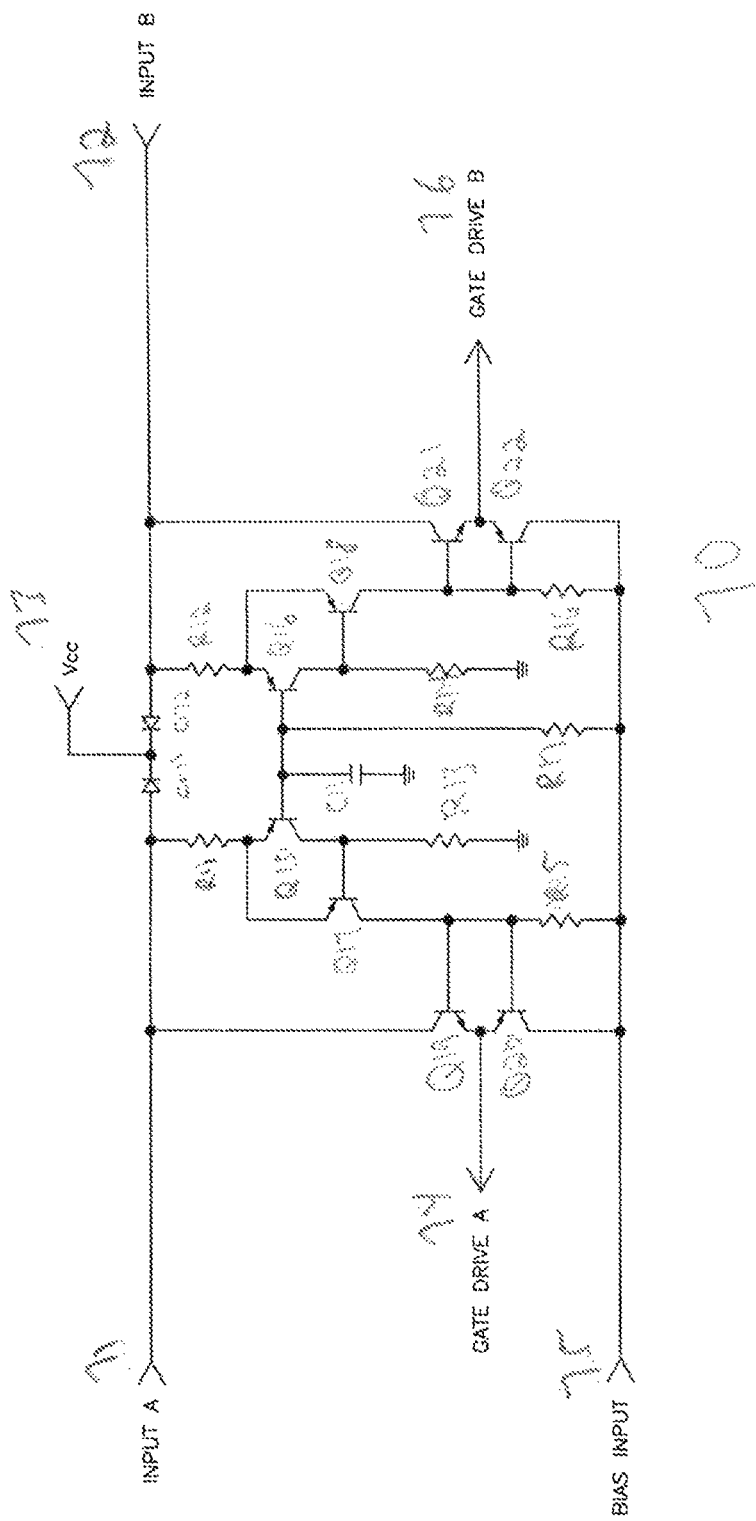
FIG. 6 is a circuit diagram of a voltage comparator of the disclosed technology.

Although the design of the comparator may use any number of suitable topologies, in some implementations, the comparator 28 of FIG. 2 can have a circuit 70 of FIG. 6. In FIG. 6, independent voltage inputs A and B 71, 72 are connected to the comparator 28 of FIG. 2. Using a conventional diode OR consisting of diodes CR11 and CR12, a voltage Vcc 73 is generated which supplies the bias voltage DC-DC converter 50 shown in FIG. 4. Operating from input A 71, resistor R11 provides a common emitter resistance for the Schmitt trigger consisting of PNP transistors Q15 and Q17. R13 provides base current for Q17 and R15 is the collector load for Q17. Complementary transistors Q19 and Q20 buffer the collector voltage of Q17 and provide a low impedance drive for the switching FETs. A mirror image for voltage source B 72 consists of Q16, Q18, Q21, Q22, R12, R14 and R16. R17 provides a base current source for either Q15 or Q16, depending on whether Input A 71 or Input B 72 is higher.

Figure 7:
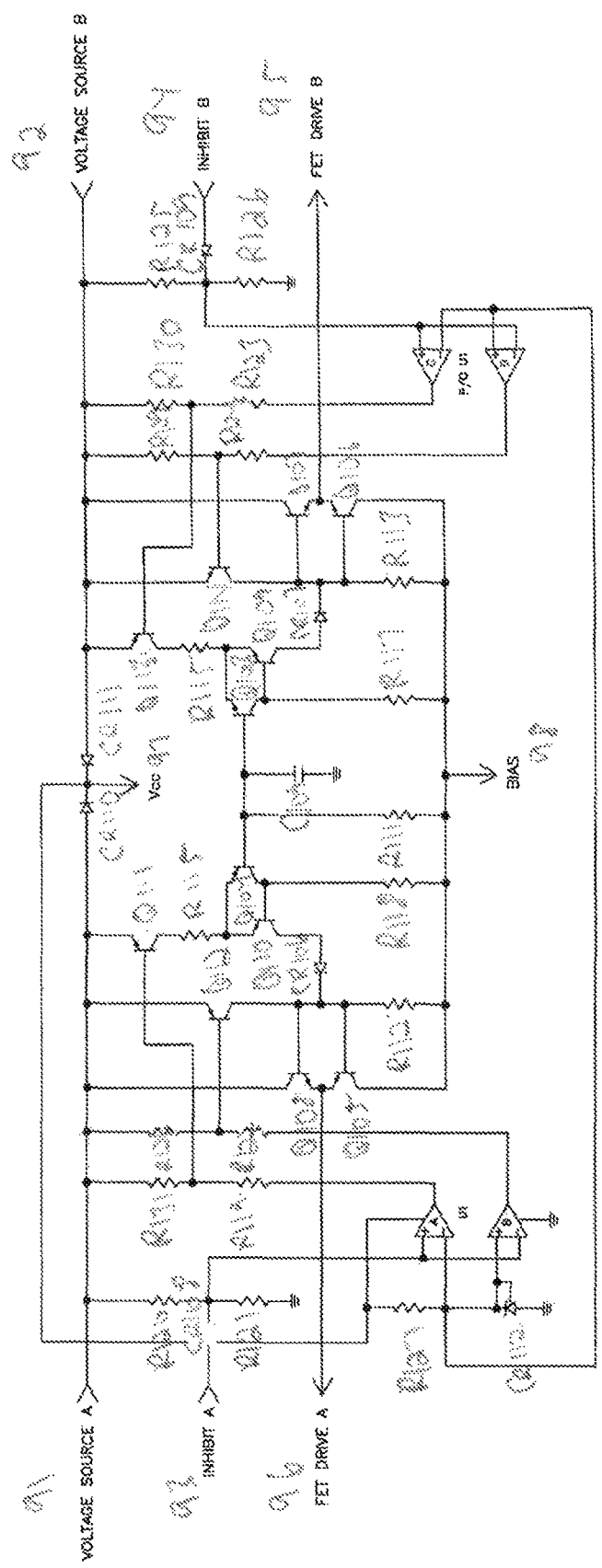
FIG. 7 is a circuit diagram of a voltage comparator of the disclosed technology.

Although the design of the comparator may use any number of suitable topologies, in some implementations, the comparator 40 of FIG. 3 can have a circuit 90 of FIG. 7. In FIG. 7, independent voltage inputs A and B 91, 92 are connected to the comparator 40. Using a conventional diode OR consisting of diodes CR110 and CR111, a voltage Vcc 97 is generated which supplies the bias voltage DC-DC converter 50 shown in FIG. 4.

Operating from input A 91 and through transistor Q111, resistor R115 provides a common emitter resistance for the Schmitt trigger consisting of PNP transistors Q104 and Q110. R111 provides base current for Q110 and R112 is the collector load for Q110. Diode CR106 limits reverse current flow from Q112 to Q110.

Complementary transistors Q105 and Q108 buffer the collector voltage of Q110 and provide a low impedance drive for the switching FETs. A mirror image for voltage source B 92 consists of CR107, Q113, Q103, Q109, Q106, Q107, Q114, R116, R117 and R113.

R111 provides a base current source for either Q103 or Q104, depending on whether Input A 91 or Input B 92 is higher.

The over-voltage protection circuitry compares the input voltage of voltage source A 91 or voltage source B 92 to a fixed reference voltage. The fixed reference voltage is derived from precision reference diode CR112, which is supplied current from the Vcc 97 through R127. The input from voltage source A 91 is connected to a voltage divider consisting of R120 and R121. The divided voltage is fed to comparators U1-A and U1-B. The output of each comparator is open collector. When the input voltage is within normal limits, comparator A's output is low and comparator B's output is open. When Comparator A output is low, transistor Q111 conducts, connecting voltage source A to the sense resistor R115.

When the input voltage source level exceeds the over voltage set point, comparator B's output goes low, making transistor Q112 conduct and FET drive A is removed. Concurrently, transistor Q111 is turned off removing the over voltage input from sense resistor R115.

A similar circuit applies to voltage source B. In order to disconnect voltage source A from the common output by using the inhibit function, a positive voltage of sufficiently high magnitude is applied to the R120, R121 voltage divider through diode CR108. This simulates an over voltage, and voltage source A is disconnected from the common output. A similar circuit applies to voltage source B.

While this specification contains many specific implementation details, these should not be construed as limitations on the scope of the disclosed technology or of what can be claimed, but rather as descriptions of features specific to particular implementations of the disclosed technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The foregoing Detailed Description is to be understood as being in every respect illustrative, but not restrictive, and the scope of the disclosed technology disclosed herein is not to be determined from the Detailed Description, but rather from the claims as interpreted according to the full breadth permitted by the patent laws. It is to be understood that the implementations shown and described herein are only illustrative of the principles of the disclosed technology and that various modifications can be implemented without departing from the scope and spirit of the disclosed technology.

What is claimed:

1. A radiation hardened active OR circuit for providing a controlled electrical response in radiation-intensive applications, the circuit comprising:
   a first voltage source;
   a second voltage source;
   a comparator for sampling the first voltage source and the second voltage source;
   a first switch being directly coupled to the comparator; and
   a second switch being directly coupled to the comparator,
   wherein the comparator selects a higher magnitude of the first voltage source and the second voltage source and connects the higher magnitude of the first voltage source and the second voltage source to a common output by steering a drive signal to one of the first switch or the second switch.

2. The circuit of claim 1 wherein the first switch is a P-channel MOSFET and the second switch is a P-channel MOSFET, wherein the first switch and the second switch require higher bias voltages, when properly driven, in radiation environments.

3. The circuit of claim 2 further comprising:
   a bias voltage DC-DC converter; and
   a diode circuit for feeding voltage to the bias voltage DC-DC converter,
   wherein the bias voltage DC-DC converter converts a low voltage source from the diode circuit into a higher bias voltage thereby properly driving the one of the first switch or the second switch.

4. The circuit of claim 3 wherein, when a bias voltage is present and when the comparator steers the higher bias voltage to the one of the first switch or the second switch, a drain to source channel of the one of the first switch or the second switch conducts and a voltage drop is reduced to a value determined by a resistance of the one of the first switch or the second switch.

5. A radiation hardened active OR circuit for providing controlled electrical response in radiation-intensive applications, the component comprising:
   a first voltage source;
   a second voltage source;
   a voltage sense/shutdown block;
   a comparator for sampling the first voltage source and the second voltage source;
   a first set of FETs, the first set of FETs being connected in series, the first set of FETs being directly coupled to the comparator; and
   a second set of FETs, the second set of FETs being connected in series, the second set of FETs being directly coupled to the comparator.
   wherein the voltage sense/shutdown block disconnects the first voltage source or the second voltage source in the, event that one of the first voltage source or the second voltage source exceeds a pre-set, programmable limit.

6. The radiation hardened active OR circuit of claim 5 wherein the use of the first set of FETs being connected in series and the second set of FETs being connected in series in each voltage source leg allows one or both of the voltage sources to be completely disconnected from a common output in the event of the one of the first voltage source or the second voltage source exceeding the pre-set, programmable limit.

7. The radiation hardened active OR circuit of claim 5 wherein, when a voltage level of the first voltage source exceeds pre-set, programmable limit, a first signal from the voltage sense/shutdown block is fed to the comparator which causes a gate drive voltage to be removed from the first set of FETs.

8. The radiation hardened active OR circuit of claim 5 wherein, when a voltage level of the second voltage source exceeds pre-set, programmable limit, a second signal from the voltage sense/shutdown block is fed to the comparator which causes a gate drive voltage to be removed from the second set of FETs.

9. The radiation hardened active OR circuit of claim 5 wherein the comparator selects a higher magnitude of the first voltage source or the second voltage source and connects the higher magnitude of the first voltage source or the second voltage source to a common output by steering a drive signal to the first set of FETs or the second set of FETs.

10. The radiation hardened active OR circuit of claim 5 wherein the first set of FETs are P-channel MOSFETs and the second set of FETs are P-channel MOSFETs, the first set of FETs and the second set of FETs requiring a higher bias voltage, when properly driven, in radiation environments.

11. The radiation hardened active OR circuit of claim 10 further comprising:
   a bias voltage DC-DC converter; and
   a diode circuit for feeding voltage to the bias voltage DC-DC converter,
   wherein the bias voltage DC-DC converter converts a low voltage source from the diode circuit into a higher bias voltage thereby properly driving the first set of FETs or the second set of FETs.

* * * * *